United States Patent
Yang et al.

(10) Patent No.: US 10,979,157 B2
(45) Date of Patent: Apr. 13, 2021

(54) METHOD FOR PERFORMING MEASUREMENT ON PSDCH INCLUDING DISCOVERY SIGNAL AND TERMINAL THEREFOR

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 15/761,319

(22) PCT Filed: Sep. 30, 2016

(86) PCT No.: PCT/KR2016/010942
§ 371 (c)(1),
(2) Date: Mar. 19, 2018

(87) PCT Pub. No.: WO2017/057937
PCT Pub. Date: Apr. 6, 2017

(65) Prior Publication Data
US 2018/0262282 A1    Sep. 13, 2018

Related U.S. Application Data

(60) Provisional application No. 62/236,157, filed on Oct. 2, 2015, provisional application No. 62/236,982, filed on Oct. 5, 2015.

(51) Int. Cl.
*H04B 17/318* (2015.01)
*H04W 24/08* (2009.01)
(Continued)

(52) U.S. Cl.
CPC ............ *H04B 17/318* (2015.01); *H04L 1/00* (2013.01); *H04L 1/189* (2013.01); *H04L 1/20* (2013.01);
(Continued)

(58) Field of Classification Search
CPC ......... H04L 1/20; H04L 1/189; H04L 5/0082; H04L 5/0048; H04W 74/0808;
(Continued)

(56) References Cited

U.S. PATENT DOCUMENTS

2014/0094183 A1    4/2014   Gao et al.
2015/0029866 A1    1/2015   Liao et al.
(Continued)

OTHER PUBLICATIONS

Huawei Agenda item 7.2.3.1.1 hereinafter Huawei (Aug. 2015) was furnished by applicant.*
(Continued)

*Primary Examiner* — Charles C Jiang
*Assistant Examiner* — Voster Preval
(74) *Attorney, Agent, or Firm* — Birch, Stewart, Kolasch & Birch, LLP

(57) ABSTRACT

A disclosure of the present specification provides a method for performing measurement on a physical sidelink discovery channel (PSDCH) including a discovery signal from an adjacent terminal. The method may comprise the steps of: when, among PSDCHs repeatedly transmitted from an adjacent terminal in n subframes, a PSDCH in a kth subframe is successfully decoded and thereby the cyclic redundancy check (CRC) thereof succeeds, regarding the CRC of PSDCHs in the subsequent n−k subframes as successful without decoding the same; and performing measurements in the kth subframe and the subsequent n−k subframes for which the CRC is regarded as successful.

8 Claims, 17 Drawing Sheets

(51) Int. Cl.
*H04L 1/00* (2006.01)
*H04L 5/00* (2006.01)
*H04L 1/18* (2006.01)
*H04L 1/20* (2006.01)
*H04L 5/14* (2006.01)

(52) U.S. Cl.
CPC .......... *H04L 5/0048* (2013.01); *H04L 5/0082* (2013.01); *H04W 24/08* (2013.01); *H04L 5/001* (2013.01); *H04L 5/0023* (2013.01); *H04L 5/14* (2013.01); *H04L 2001/0097* (2013.01)

(58) Field of Classification Search
CPC .......... H04W 72/0406; H04W 74/006; H04W 72/14; H04W 16/14; H04W 24/08; H04B 17/318
See application file for complete search history.

(56) References Cited

U.S. PATENT DOCUMENTS

| | | | |
|---|---|---|---|
| 2016/0080963 A1* | 3/2016 | Marinier | H04W 24/08 370/252 |
| 2016/0337935 A1* | 11/2016 | Patil | H04W 76/14 |
| 2018/0139599 A1* | 5/2018 | Yasukawa | H04W 8/005 |
| 2018/0146494 A1* | 5/2018 | Khoryaev | H04W 76/15 |
| 2018/0206140 A1* | 7/2018 | Panteleev | H04W 72/044 |
| 2018/0212733 A1* | 7/2018 | Khoryaev | H04L 5/0051 |
| 2018/0213500 A1* | 7/2018 | Li | H04W 56/0015 |
| 2018/0220480 A1* | 8/2018 | Agiwal | H04W 24/08 |
| 2018/0227973 A1* | 8/2018 | Tsuboi | H04W 48/12 |
| 2018/0279258 A1* | 9/2018 | Yasukawa | H04L 5/0053 |

OTHER PUBLICATIONS

Huawei et al., "Remaining details of PC5 measurements", R1-153778, 3GPP TSG RAN WG1 Meeting #82, Beijing, China, Aug. 24-28, 2015, See sections 1, 2.

Itri, "Considerations for the remaining details of PC5 measurements", R1-154371, 3GPP TSG RAN WG1 Meeting #82, Beijing, China, Aug. 24-28, 2015, See sections 1-2.2.

LG Electronics, "Discussion on PC5 measurement for UE-to-Network relay operation", R1-154254, 3GPP TSG RAN WG1 Meeting #82, Beijing, China, Aug. 24-28, 2015, See sections 2.

* cited by examiner

METHOD FOR PERFORMING MEASUREMENT ON PSDCH INCLUDING DISCOVERY SIGNAL AND TERMINAL THEREFOR

CROSS REFERENCE TO RELATED APPLICATIONS

This application is the National Phase of PCT international Application No. PCT/KR2016/010942, filed on Sep. 30, 2016, which claims priority under 35 U.S.C. 119(e) to U.S. Provisional Application No. 62/236,157, filed on Oct. 2, 2015 and 62/236,982, tiled on Oct. 5, 2015, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, due to an increase in user requirements for social network service (SNS), communication between terminals which are physically close to each other, that is, device to device (D2D) communication is required.

The D2D communication may be performed between the terminals located within coverage of a base station or may be performed between the terminals located outside the coverage of the base station. Furthermore, the D2D communication may be performed between the terminal located outside the coverage of the base station and the terminal located within the coverage of the base station. In this case, the terminal located within the coverage of the base station may serve as a repeater. When a plurality of terminals which may serve as the repeater is provided, any one needs to be selected based on measurement.

SUMMARY OF THE INVENTION

Accordingly, the disclosure of the present specification has been made in an effort to provide a measurement method for enabling selection of a terminal which may operate as a repeater.

In an aspect, provided is a method for performing measurement on a physical sidelink discovery channel (PSDCH) including a discovery signal from an adjacent terminal. The method may include: when a PSDCH in a $k^{th}$ subframe among PSDCHs repeatedly transmitted from an adjacent terminal in n subframes is successfully decoded and then a cyclic redundancy check (CRC) thereof is determined as successful, considering CRCs of PSDCHs in the subsequent n−k subframes as successful without decoding the same; and performing measurements in the $k^{th}$ subframe and the subsequent n−k subframes for which the CRC is regarded as successful.

The measurement may be sidelink discovery reference signal received power (SD-RSRP) measurement.

The SD-RSRP may mean average received power on a resource element (RE) including a demodulation reference signal (DMRS) for demodulating the PSDCH in a substrate for which the CRC is regarded as successful.

When n−k is smaller than a predetermined number, the CRC may be regarded as successful and even the kth previous subframe may be used for the measurement even though the CRC on the subframe before the kth subframe is not successful.

The method may further include selecting a UE which is able to serve as a repeater based on an execution result of the measurement.

In another aspect, provided is a UE performing measurement. The UE may include:

a processor configure to: when a PSDCH in a $k^{th}$ subframe among PSDCHs repeatedly transmitted from an adjacent terminal in n subframes is successfully decoded and then a cyclic redundancy check (CRC) thereof is determined as successful, consider CRCs of PSDCHs in the subsequent n−k subframes as successful without decoding the same. The processor is further configured to perform the measurement on the $k^{th}$ subframe and n−k subsequent subframes for which the CRC is regarded as successful.

According to the disclosure of the present specification, an effective measurement method is presented.

DESCRIPTION OF EXEMPLARY EMBODIMENTS

Figure 1:
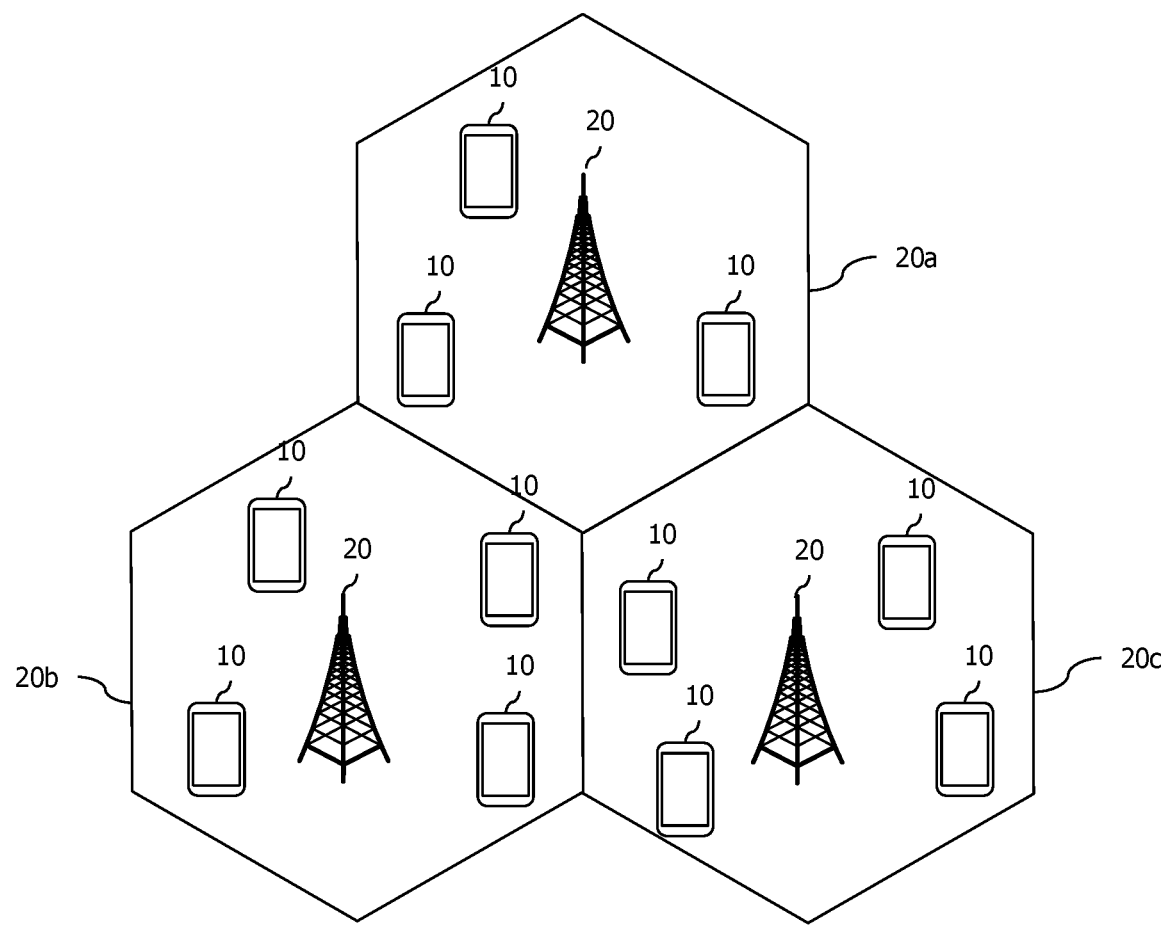
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
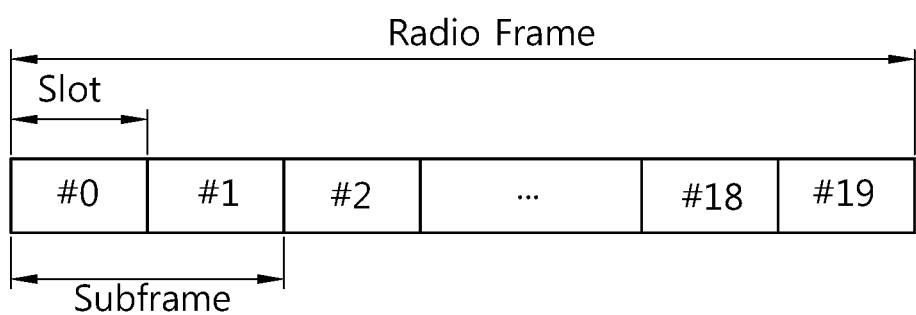
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
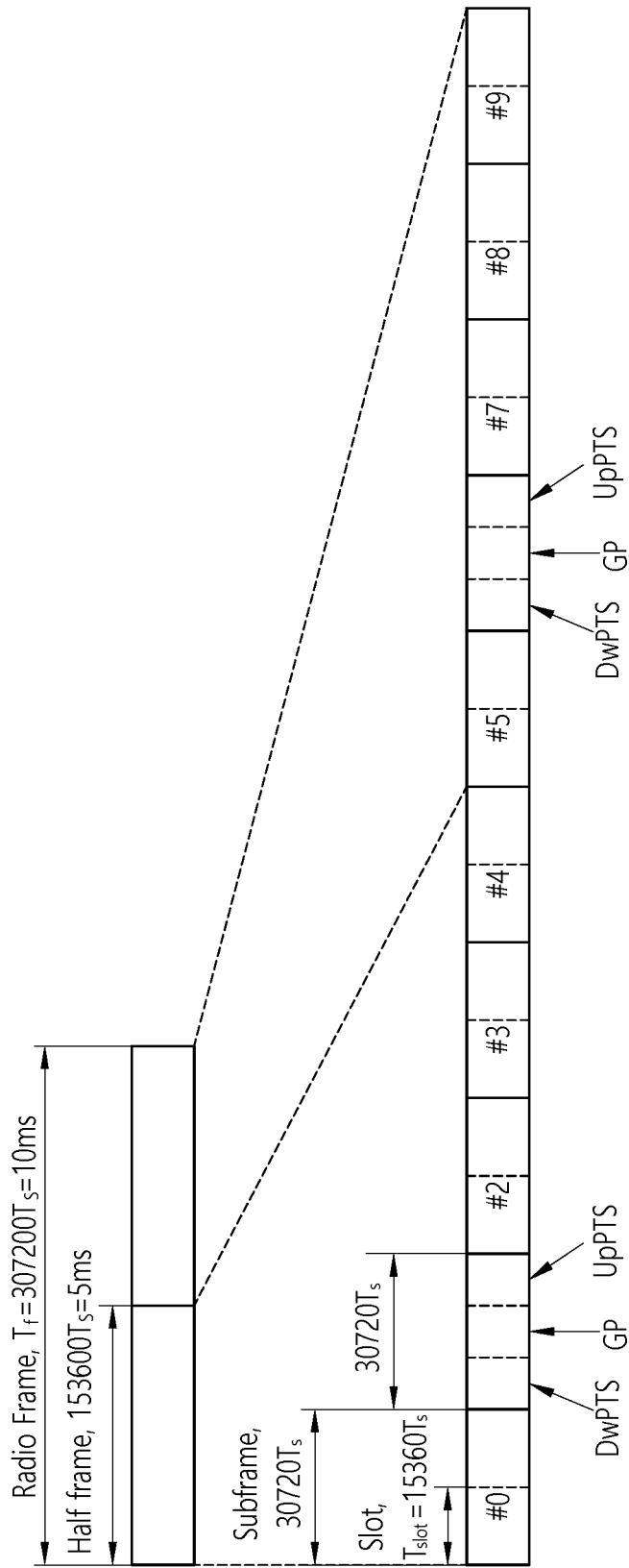
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | | |
| 5 | 6592 * Ts | 4384 * Ts | 5120 * ts | 20480 * Ts | 4384 * Ts | 5120 * ts |
| 6 | 19760 * Ts | | | 23040 * Ts | | |
| 7 | 21952 * Ts | | | — | | |
| 8 | 24144 * Ts | | | — | | |

Figure 4:
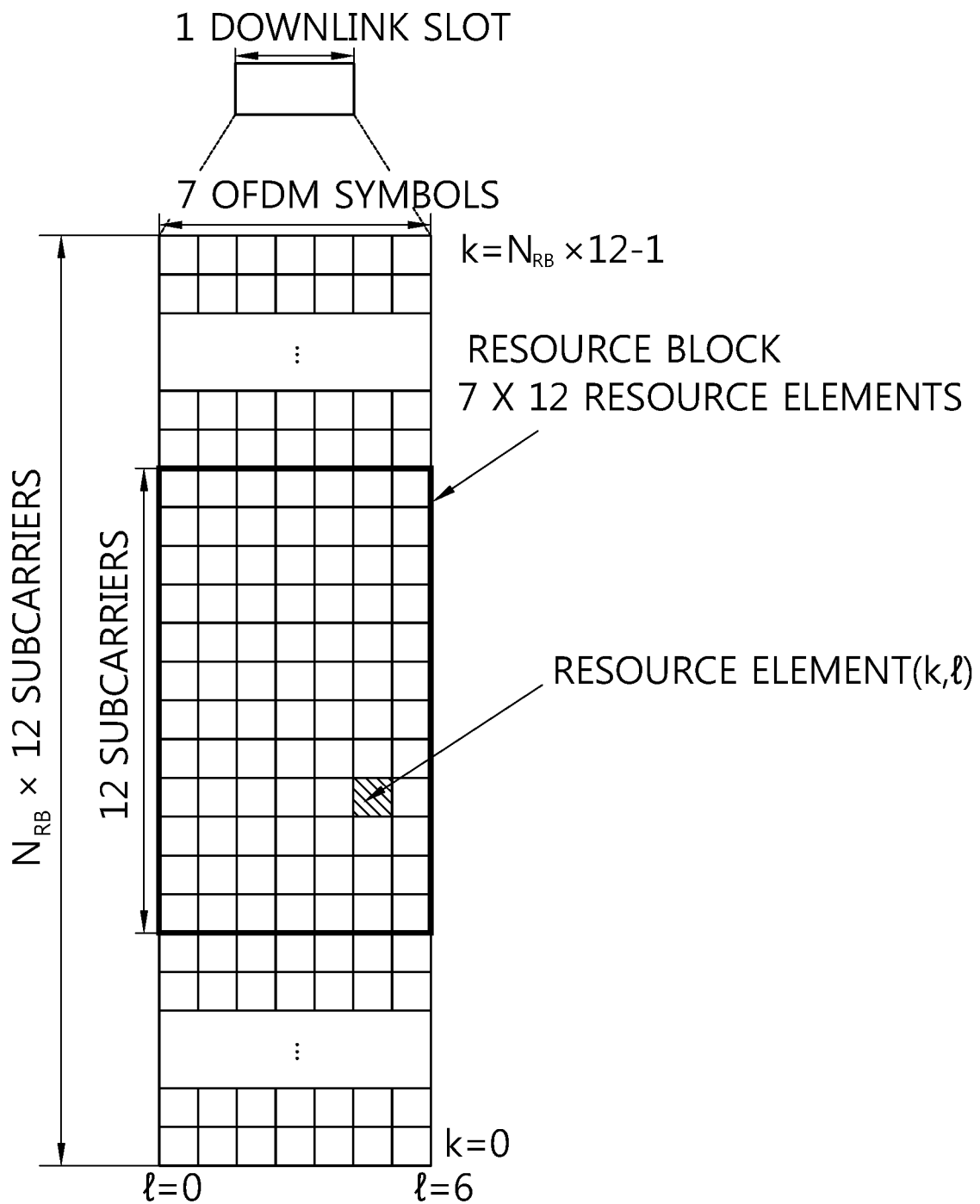
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
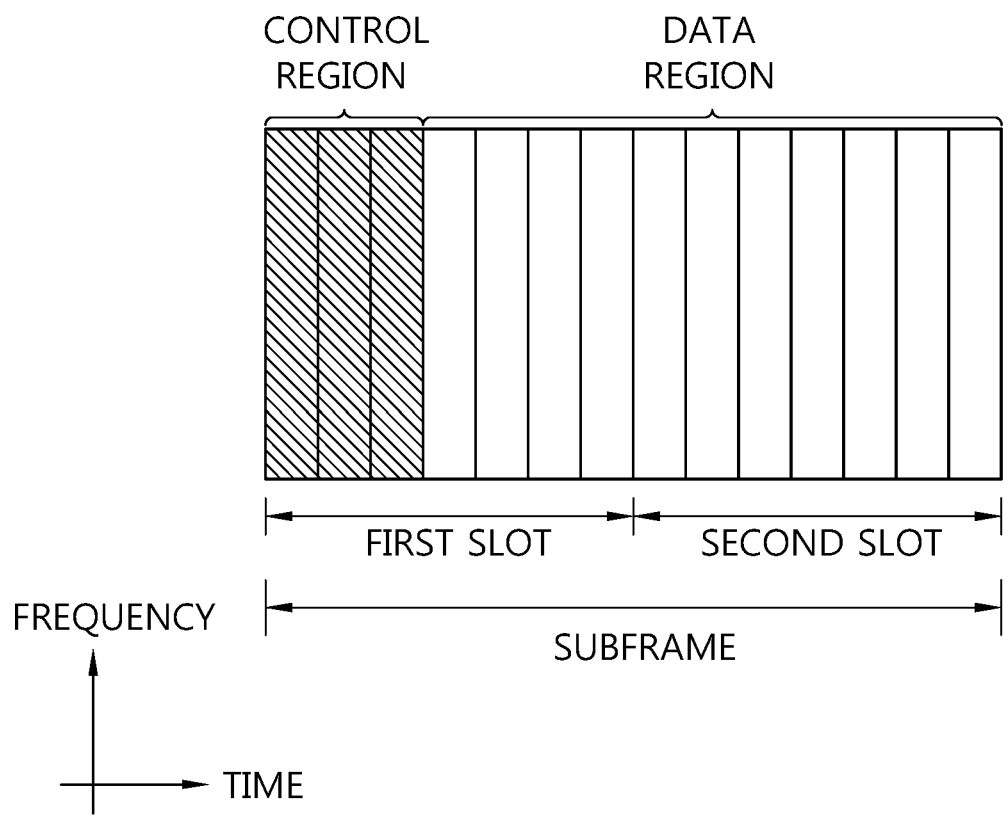
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
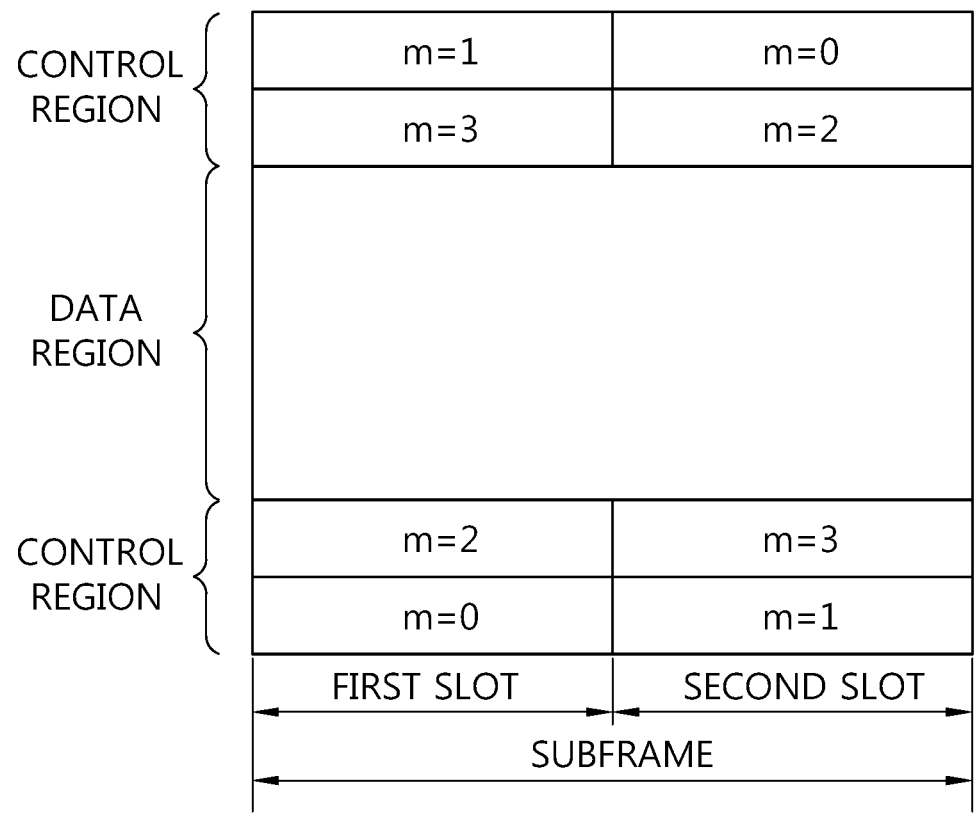
FIG. 6. illustrates a structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
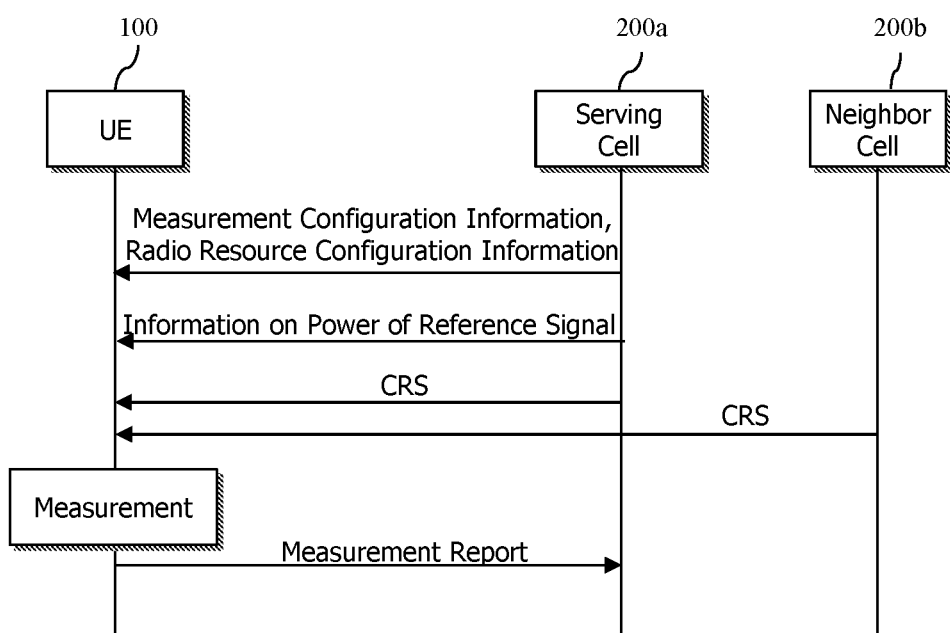
FIG. 7 illustrates a measurement and a measurement report.

FIG. 7 illustrates a measurement and a measurement report.

In wireless communication systems, it is indispensible to support mobility of the UE 100. Accordingly, the UE 100 continuously measures quality for serving cell that currently provides service and quality for a neighbor cell. The UE 100 reports the measurement result to a network on an appropriate time, and the network provides an optimal mobility to the UE through handover, and so on. Commonly, the measurement of such an object is called a radio resource management (RRM) measurement.

Figure 8:
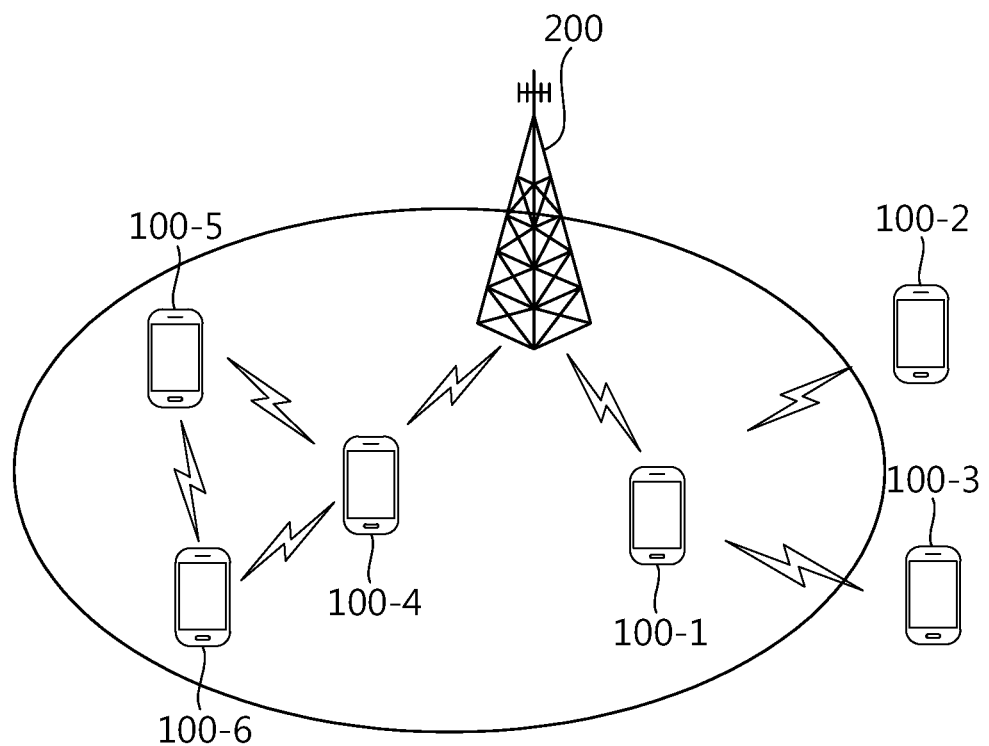
FIG. 8 illustrates a concept of deice to device (D2D) communication expected to be introduced in a next-generation communication system.

As we can know with reference to FIG. 8, if each of the serving cell 200a and the neighbor cell 200b transmit a cell-specific reference signal (CRS) to the UE 100, the UE 100 performs measurement through the CRS, and transmits the measurement result to the serving cell 200a.

In this time, the UE 100 may perform the measurement in the following three methods.

1) RSRP (reference signal received power): This represents an average reception power of all REs that carry the CRS which is transmitted through the whole bands. In this time, instead of the CRS, an average reception power of all REs that carry the CSI RS may also be measured.

2) RSSI (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a subband. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a measurement configuration information element (IE) from the serving cell 100a for the measurement. The message that includes the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. The message that includes the measurement result is called a measurement report message.

The measurement configuration IE may include measurement object information. The measurement object information is information of an object that is going to perform a measurement by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

Meanwhile, the UE 100 also receives a radio resource configuration information element (IE) as shown in the drawing.

The radio resource configuration dedicated IE is used to configure/modify/cancel radio bearers, to modify MAC configuration, etc. The radio resource configuration dedicated IE includes subframe pattern information. The subframe pattern information is information on a measurement resource restriction pattern on the time domain, for measuring RSRP and RSRQ of a primary cell (PCell).

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Device to Device (D2D) Communication>

On the other hand, hereinafter, the D2D communication expected to be introduced in a next-generation communication system will be described.

FIG. 8 illustrates a concept of deice to device (D2D) communication expected to be introduced in a next-generation communication system.

Communication between UEs which are physically closed to each other, that is, device to device (D2D) communication) is required due to an increase in user requirements for a social network service (SNS).

In order to reflect the aforementioned requirements, as illustrated in FIG. 8, a scheme that allows the UE #1 100-1, the UE #2 100-2, and the UE #3 100-3 or the UE #4 100-4, the UE #5 100-5, and the UE #6 100-6 to directly communicate with each other without intervention of a base station (eNodeB) 200 is discussed. Of course, the UE #1 100-1 and the UE #4 100-4 may directly communicate with each other under a help of the base station (eNodeB) 200. Meanwhile, the UE #1 100-1 may serve as a relay for the UE #2 100-2 and the UE #3 100-3.

Meanwhile, the D2D communication may be called a proximity service (ProSe). In addition, a UE that performs the proximity service may be called a ProSe UE. Moreover, a link between the UEs used in the D2D communication may be called a sidelink. Frequency bands which may be used for the sidelink are described below.

TABLE 3

| Sidelink band | E-UTRA band | Transmission $F_{UL\_low}$-$F_{UL\_high}$ | Reception $F_{DL\_low}$-$F_{DL\_high}$ | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the side link are described below.

PSSCH(Physical Sidelink Shared Channel)
PSCCH(Physical Sidelink Control Channel)
PSDCH(Physical Sidelink Discovery Channel)
PSBCH(Physical Sidelink Broadcast Channel)

Further, physical signals used for the sidelink are described below.

Demodulation Reference signal (DMRS)
Sidelink Synchronization signal (SLSS)

The SLSS includes a primary SLSS (PSLSS) and a secondary SLSS (SSLSS).

Figure 9:
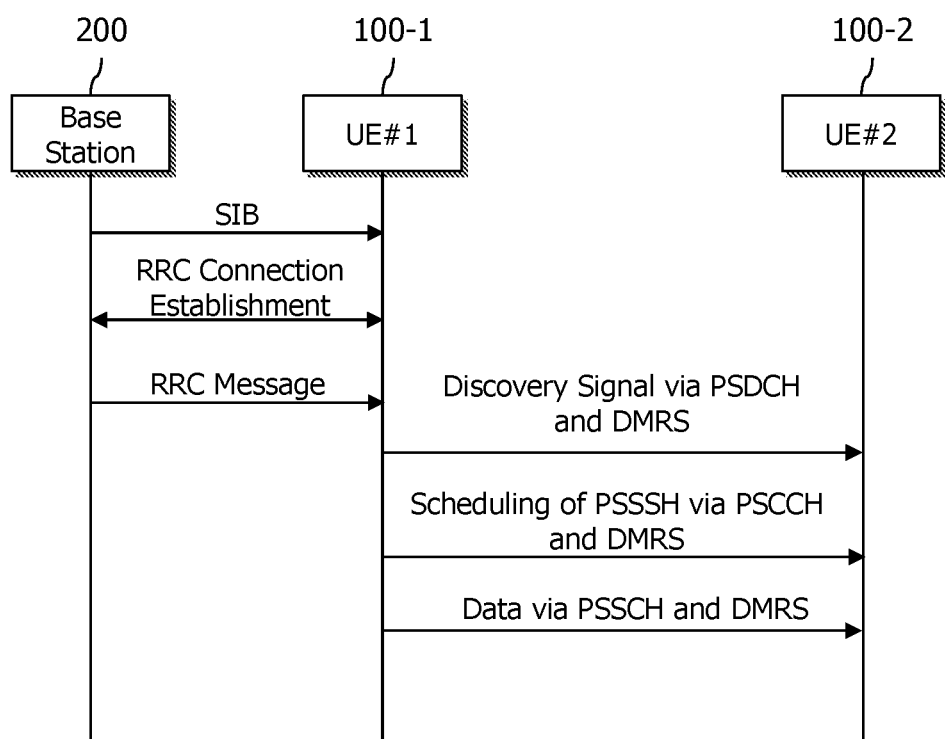
FIG. 9 illustrates an example of D2D communication or ProSe communication between UE #1 and UE #2 illustrated in FIG. 8.
Figure 10:
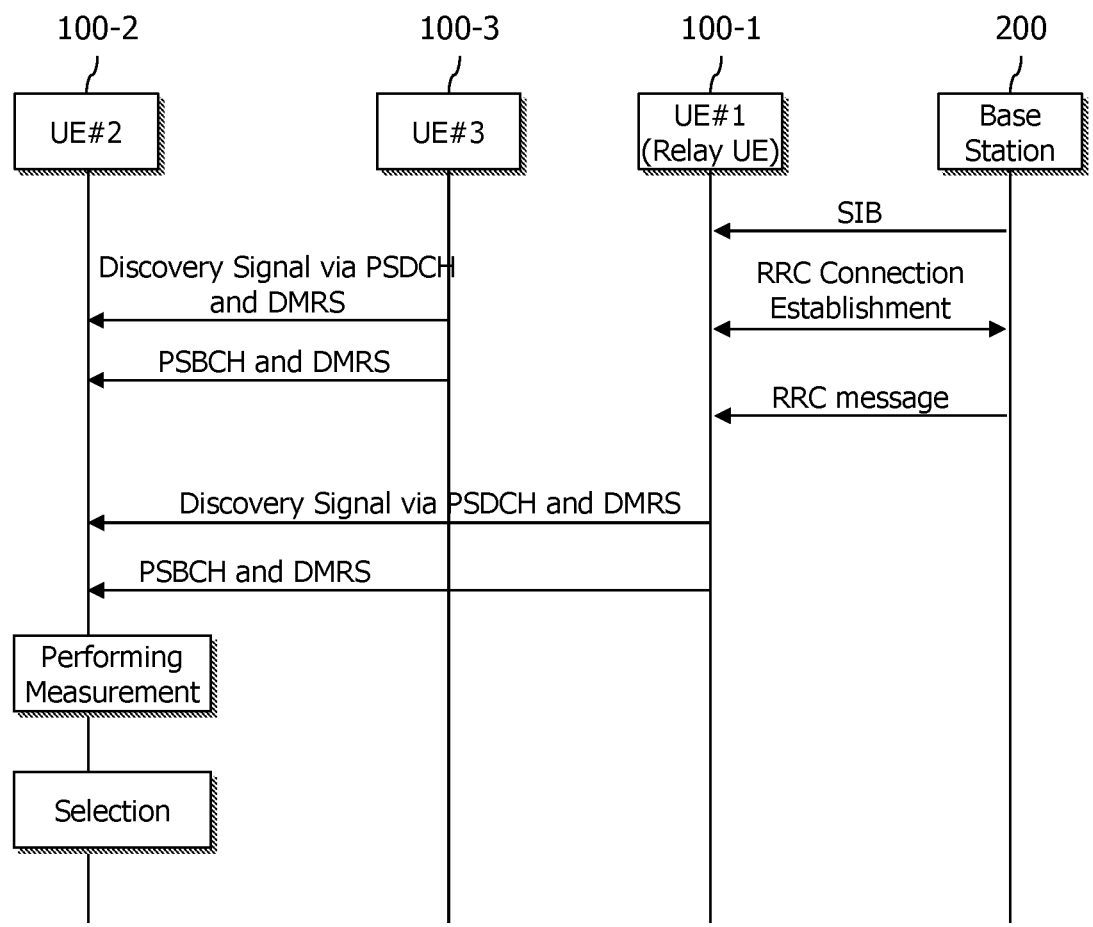
FIG. 10 illustrates an example in which UE #2 illustrated in FIG. 8 selects relay UE.

FIG. 10 illustrates an example of D2D communication or ProSe communication between UE #1 and UE #2 illustrated in FIG. 9.

Referring to FIG. 10, the base station 200 broadcasts a system information block (SIB) into the cell.

The SIB may include information on a resource pool associated with the D2D communication. The information on the resource pool associated with the D2D communication may be divided into SIB type 18 and SIB type 19.

The SIB type 18 may include resource configuration information for the D2D communication. In addition, the SIB type 19 may include resource configuration information associated with a D2D discovery.

The SIB type 19 includes discSyncConfig as below.

TABLE 4

| | SIB type 19 |
|---|---|
| discSyncConfig | Represents a configuration regarding whether the UE is permitted to receive or transmit synchronization information. When the base station (E-UTRAN) makes the UE transmit the synchronization information by using dedicated signaling, the base station (E-UTRAN) may configure discSyncConfig. |

The discSyncConfig includes SL-SyncConfig. The SL-SyncConfig includes configuration information for receiving the SLSS and transmitting the SLSS as shown in a table given below.

TABLE 5

| | SL-SyncConfig field description |
|---|---|
| discSyncWindow | Called even a searching window. Represents a synchronization window in which the UE expects the SLSS. A value may be set to w1 or w2. The w1 value represents 5 milliseconds and the w2 value corresponds to a length acquired by the normal CP by 2. |

TABLE 5-continued

| | SL-SyncConfig field description |
|---|---|
| syncTxPeriodic | Represents whether the UE transmits the SLSS once within one period of a discovery signal transmitted thereby or periodically (for example, every 40 ms). In the case of the periodic transmission, the UE further transmits MasterInformationBlock-SL. |
| syncTxThreshIC | Represents a threshold used when the UE is positioned in coverage. When an RSRP value measured for a counterpart UE (recognized like the cell) selected for the sidelink communication is smaller than the threshold, the UE may transmit the SLSS for the sidelink communication with the counterpart UE. |
| txParameters | Includes a parameter regarding a configuration for transmission. |

Meanwhile, the UE #1 100-1 positioned in the coverage of the base station 200 establishes the RRC connection with the base station.

In addition, the UE #1 100-1 receives an RRC message, for example, an RRC Connection Reconfiguration message from the base station 200. The RRC message includes a discovery configuration (hereinafter, referred to as discConfig). The discConfig includes configuration information for a discover resource pool (hereinafter, referred to as DiscResourcePool) for the discovery. The DiscResourcePool includes information shown in a table given below.

TABLE 6

| | DiscResourcePool |
|---|---|
| discPeriod | May be written even as a discovery period and as a period of a resource assigned in the cell for transmitting/receiving the discovery message may be called a PDSCH period. A value may be rf32, rf64, rf128, rf256, rf512, rf1024, or the like. The value represents the number of radio frames. That is, when the value is rf32, the rf32 represents 32 radio frames. |
| numRepetition | Represents the number of times when subframeBitmap for mapping to a subframe generated within discPeriod is repeated. The base station configures numRepetition and subframeBitmap so that the mapped subframe does not exceed the discPeriod. |
| TF-ResourceConfig | Designates a set of time/frequency resources used for the sidelink communication. |

The TF-ResourceConfig includes information shown in a table given below.

TABLE 7

| SL-TF-ResourceConfig-r12 ::= | SEQUENCE { |
|---|---|
| prb-Num-r12 | INTEGER (1..100), |
| prb-Start-r12 | INTEGER (0..99), |
| prb-End-r12 | INTEGER (0..99), |
| offsetIndicator-r12 | SL-OffsetIndicator-r12, |
| subframeBitmap-r12 | SubframeBitmapSL-r12 |
| } | |

The SubframeBitmapSL is shown in a table given below.

TABLE 8

| SubframeBitmapSL | May be written even as discoverySubframeBitmap and designates a subframe bitmap representing a resource used for the sidelink. A value may be designated as bs4, bs8, bs12, bs16, bs30, bs40, bs40, and the like. For example, the bs40 value means a bit string length 40. |
|---|---|

The SL-OffsetIndicator includes information shown in a table given below.

TABLE 9

| | |
|---|---|
| SL-OffsetIndicator | May be written even as discoveryOffsetIndicator and represents an offset of a first period of the resource pool within an SFN cycle. |
| SL-OffsetIndicatorSync | May be written even as SyncOffsetIndicator and represents a relationship between SFNs including a synchronization resource and the subframes according to an equation. (SFN*10 + Subframe Number) mod 40 = SL-OffsetIndicatorSync. |

Meanwhile, the UE #1 100-1 may transmit the discovery signal through the PDSCH in order to discover whether an appropriate UE is present therearound or notify the presence of the UE #1 100-1 for the D2D communication or ProSe communication.

Meanwhile, further, the UE #1 100-1 may transmit scheduling assignment (SA) through the PSCCH. In addition, the UE #1 100-1 may transmit the PSSCH including data based on the scheduling assignment (SA).

FIG. 10 illustrates an example in which UE #2 illustrated in FIG. 8 selects relay UE.

Referring to FIG. 10 together with FIG. 8, the UE #2 100-2 located outside the coverage of the base station receives a discovery signal from adjacent UEs and a DMRS for demodulating the discovery signal in order to communicate with the D2D communication with the UE #1 100-1 which is located in the coverage of the base station to operate as the relay UE. Further, UE #2 100-2 receives a PSBCH and the DMRS for demodulating the PSBCH from the adjacent UEs.

Then, the UE #2 100-2 performs measurement based on the received signals.

The measurement includes measurement of sidelink reference signal received Power (S-RSRP) and measurement of sidelink discovery reference signal received power (SD-RSRP).

Herein, the S-RSRP means average received power on a resource element (RE) including the DMRS for demodulating the PSBCH received in six middle PBBs. In this case, power per RE is determined from energy received on a part other than a CP part in an OFDM symbol.

The SD-RSRP means the average received power on the RE including the DMRS for demodulating the PSDCH when the CRC is successful according to successful decoding of the PSDCH including the discovery signal.

When the measurement is completed, the UE #2 100-2 selects the UE #1 100-1 which may operate as the relay UE based on a result of the measurement, that is, a measurement result of the SD-RSRP.

Figure 11:
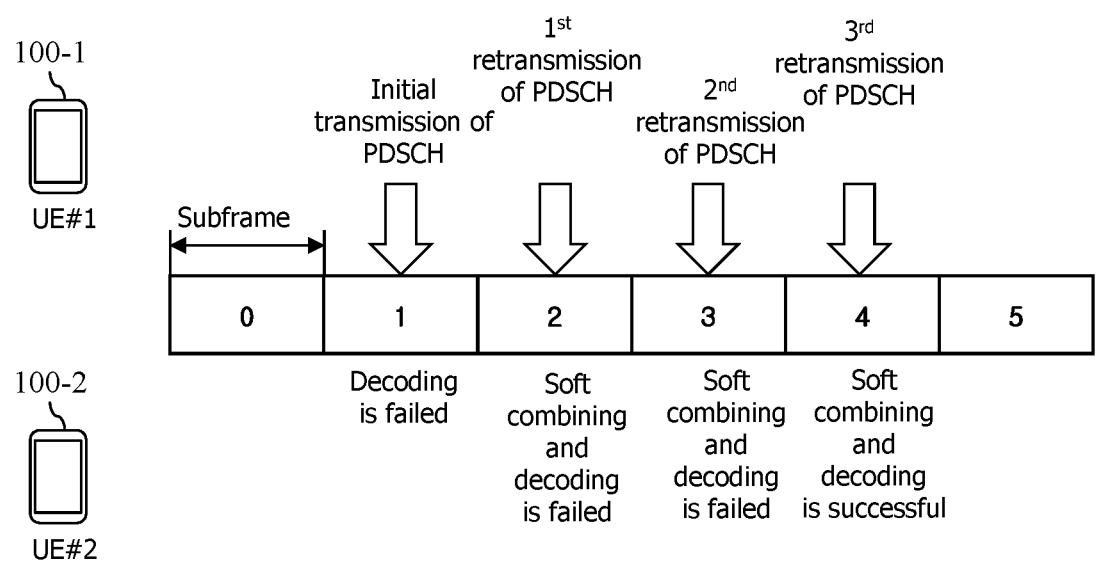
FIG. 11 illustrates an example in which a PDSCH including a discovery signal is repeated transmitted.

FIG. 11 illustrates an example in which a PDSCH including a discovery signal is repeated transmitted.

As can be seen with reference to FIG. 11, the UE #1 100-1 may repeatedly transmit the PSDCH including the discovery signal on a plurality of subframes. Then, the UE #2 100-2 may softly combine and decode the PSDCH repeatedly received.

For example, the UE #2 100-2 fails to decode the PSDCH on subframe #1, subframe #2, and subframe #3 illustrated in FIG. 11, but may succeed in decoding the PDSCH on subframe #4 through soft combining.

As described above, in the example illustrated in FIG. 11, only one subframe succeeding in decoding the PSDCH exists. However, as described above, the SD-RSRP is defined as being measured in the RE on the subframe in which the PSDCH is successfully decoded. Therefore, in the example illustrated in FIG. 11, the measurement of the SD-RSRP is performed only once, and as a result, the number of times of measurement may be too small. Particularly, in order to softly combine and decode a plurality of PSDCHs, even though PSDCHs of subframe #1 to subframe #3 are also used, but it may be inefficient not to perform the SD-RSRP measurement.

Disclosure of Present Specification

Therefore, a method for solving the above-mentioned problems will be described below. In order to deduce the solving method, the inventor of the present patent conducts a simulation.

First, an assumption of the simulation is as follows.

TABLE 10

| Simulation parameter | Value |
|---|---|
| Operation scenario | Reception by D2D UE is performed outer of coverage (OOC) Reception by D2D UE is performed in coverage |
| System bandwidth | 10 MHz |
| CP length | Normal CP |
| Number of PDSCH retransmission times | 0, 3 |
| PDSCH soft combining | Activated/deactivated |
| SD-RSRP measurement resource | DMRS for PSDCH is used for measurement SD-RSRP measurement is performed only when CRC is successful as decoding PSDCH is successful |
| RSRP L1 measurement period | One D2D discovery cycle (320 ms) |
| RSRP L3 filtering | Deactivated |
| Antenna configuration | 1 x 2 low correlation |
| Provided simulation result | 1) CDF for SD-RSRP measurement error 2) SD-RSRP measurement success rate |

Meanwhile, the scenario is as follows in the simulation assumption.

TABLE 11

| Simulation parameter and scenario | | Scenario 1 | Scenario 2 |
|---|---|---|---|
| PSDCH confliction | | No PSDCH confliction | PSDCH transmissions of UEs conflict with each other |
| Transmission UE D2D UE#1 (available signal) | | UE#1 | UE#3 |
| | Transmission | PSDCH | PSDCH |
| | Time offset | 1 us (based on w.r.t.) | 1 us (based on w.r.t.) |
| | Frequency offset | +200 Hz (based on w.r.t.) | +200 Hz (based on w.r.t.) |

TABLE 11-continued

| Simulation parameter and scenario | | Scenario 1 | Scenario 2 |
|---|---|---|---|
| D2D UE#3 (interference signal) | Transmission | | PSDCH (the same resource as UE#1) |
| | Time offset | | −1 us (based on w.r.t.) |
| | Frequency offset | | −200 Hz (based on w.r.t.) |
| Propagation channel | UE#1 | AWGN/EPA5/ETU70 | AWGN/EPA5/ETU70 |
| | UE#3 | NA | AWGN/EPA5/ETU70 |
| SINR (UE#1) | | −6..5 dB | 3/6/9 dB * |
| INR (UE#3) | | NA | 3 dB * |
| Assuming receiving UE time offset (based on w.r.t.) | | [−CP/2 CP/2] | [−CP/2 CP/2] |

With respect to the simulation assumption, the following parameters are used. d.
  a. Discovery period (discPeriod): 320 ms
  b. Subframe bitmap (subframeBitmap)
  c. Number of retransmission times (numRetx)=3(RV={0, 2, 3, 1})
    11110000_00000000_00000000_00000000_00000000
  d. Number of retransmission times (numRetx)=0 (RV=0)
    10000000_00000000_00000000_00000000_00000000
  e. Number of repetition times (numRepetition): 8
  f. Transmission probability (txProbability): 1
  g. When number of retransmission times (numRetx)=3, SD-RSRP is measured When soft combining is deactivated
Option 1: Calculating the average of the SD-RSRP on subframes in which decoding is successful among the subframes in which retransmission of the PSDCH is performed
Option 2: Calculating the average of the SD-RSRP with respect to a subframe in which first decoding is successful and subsequent subframes in which decoding is not performed among the subframes in which the retransmission of the PSDCH is performed When the soft combining is activated
Option 1: Calculating the average of the SD-RSRP with respect to the subframe in which first decoding is successful and subsequent subframes in which decoding is not performed among the subframes in which the retransmission of the PSDCH is performed
Option 2: If the retransmission of the nth PSDCH is successfully decoded, the retransmission of the subsequent PSDCH is not decoded and is averaged over all retransmissions When soft combining is activated, it is assumed that decoding continues to occur in other retransmissions other than the first retransmission. In order to average SD RSRP measurements on all subframes in which retransmission is performed, more memory resources are needed, and as a result, complexity increases. However, when the decoding of the retransmitted PSDCH is successful, the SD-RSRP measurement is averaged with respect to the subframe in which the decoding is successful and the subframe in which the subsequent retransmission is performed without decoding the subsequent retransmission to save a memory. Accordingly, hereinafter, when the soft combining is activated, option 1 will be used in the simulation.

Accordingly, when the soft combining is deactivated, option 1 will be used in the simulation.

In the case where the retransmission is performed when the UE #2 measures the SD-RSRP with respect to the PSDCH including the discovery signal from the UE #1 serving as the repeater, a measurement success rate of the SD-RSRP of the UE #2 when the soft combining is performed is higher than when the soft combining is not performed. At present, the SD-RSRP measurement for selecting the UE #1 in which the UE #2 serves as the repeater is performed only for a subframe in which decoding the PSDCH is successful and the CRC is thus successful. When four retransmissions are configured, the UE #2 may perform the soft combining or not perform the soft combining at the time of decoding the PSDCH. Therefore, the subframe for measuring the SD-RSRP may vary depending on whether the soft combining is performed.

The SD-RSRP measurement of the UE #2 will be described separately with respect to a case where the CRC for first retransmission of the PSDCH is successful, a case where the CRC for second retransmission of the PSDCH is successful, a case where the CRC for third retransmissions of the PSDCH is successful, and a case where the CRC for fourth retransmission is successful regardless of whether the soft combining is performed. This will be described with reference to FIGS. 12A to 12D.

Figure 12A:
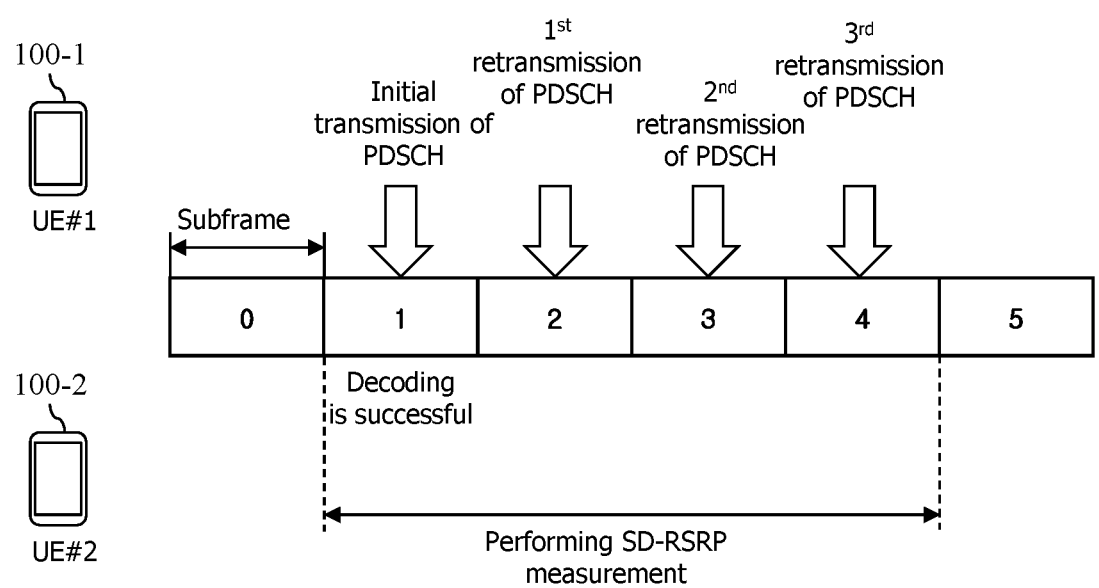
FIG. 12A illustrates an example in which CRC for initial transmission of the PDSCH is successful.

FIG. 12A illustrates an example in which CRC for initial transmission of the PDSCH is successful.

As illustrated in FIG. 12A, the UE #2 100-2 succeeds in decoding the initial transmission of the PSDCH, and as a result, the CRC is successful.

In this case, when the SD-RSRP measurement needs to be performed on the subframe in which the CRC is successful, the UE #2 100-2 needs to perform the decoding even with respect to the first, second, and third retransmission of the subsequent PSDCH. However, even though the decoding is successful for the initial transmission of the PSDCH, it may be inefficient in terms of power consumption to perform decoding for all subsequent retransmissions only for the SD-RSRP measurement.

Therefore, the UE #2 100-2 does not perform decoding for the first, second, and third retransmissions of the PSDCH, assumes that the CRC is successful, and may use four retransmitted subframes for the RSRP measurement. Accordingly, SD-RSRP measurement accuracy may be enhanced.

Figure 12B:
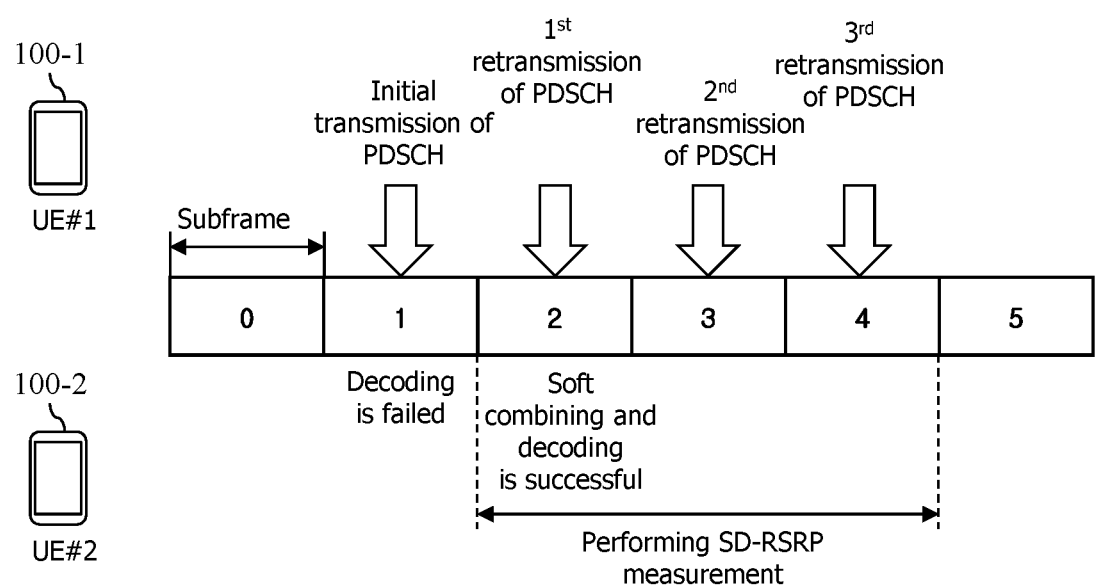
FIG. 12B illustrates an example in which the CRC for first retransmission of the PDSCH is successful.

FIG. 12B illustrates an example in which the CRC for first retransmission of the PDSCH is successful.

As illustrated in FIG. 12B, the UE #2 100-2 fails to decode the initial transmission of the PSDCH, but succeeds in decoding the first retransmission of the PSDCH, and as a result, the CRC is successful.

In this case, when the SD-RSRP measurement needs to be performed on the subframe in which the CRC is successful, the UE #2 100-2 needs to perform the decoding even with respect to the second and third retransmissions of the subsequent PSDCH.

However, it may be inefficient in terms of the power consumption to just perform decoding for all subsequent retransmissions only for the SD-RSRP measurement.

Therefore, the UE #2 100-2 does not perform decoding for the second and third retransmissions of the PSDCH, assumes that the CRC is successful, and may use three retransmitted subframes for the SD-RSRP measurement. Accordingly, the SD-RSRP measurement accuracy may be enhanced.

Alternatively, the UE #2 100-2 does not perform decoding for the second and third retransmissions of the PSDCH, assumes that the CRC is successful, and then, may use four (that is, initial transmission and first, second, and third retransmissions) subframes for the SD-RSRP measurement. In this case, although the CRC is not successful for the initial transmission of the PSDCH, the UE #2 100-2 may assume that the CRC is successful even for the initial transmission of the PSDCH and consider that the subframes are used for the SD-RSRP measurement even for the initial transmission because the CRC is successful for the first retransmission of the PSDCH. However, accordingly, the subframe in which the CRC is unsuccessful needs to be buffered, so that the memory may be wasted and the complexity may increase.

Figure 12C:
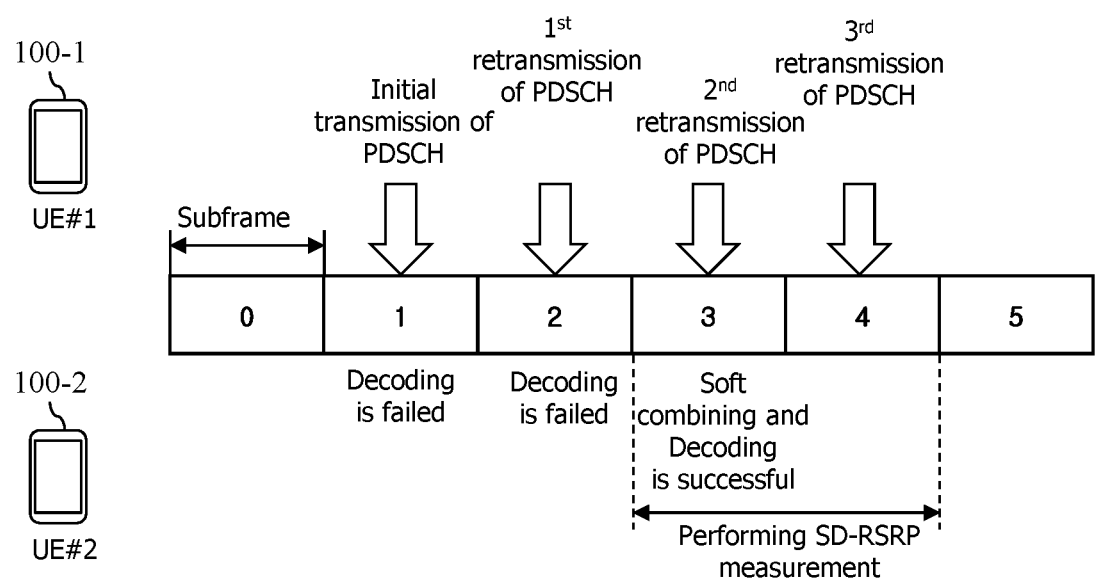
FIG. 12C illustrates an example in which the CRC for second retransmission of the PDSCH is successful.

FIG. 12C illustrates an example in which the CRC for second retransmission of the PDSCH is successful.

As illustrated in FIG. 12C, the UE #2 100-2 fails to decode the initial transmission of the PSDCH and the first retransmission of the PSDCH, but succeeds in decoding the second retransmission of the PSDCH, and as a result, the CRC is successful.

In this case, when the SD-RSRP measurement needs to be performed on the subframe in which the CRC is successful, the UE #2 100-2 needs to perform the decoding even with respect to the third retransmissions of the subsequent PSDCH. However, it may be inefficient in terms of the power consumption to just perform decoding for third subsequent retransmission for the SD-RSRP measurement.

Therefore, the UE #2 100-2 does not perform decoding for the third retransmission of the PSDCH, assumes that the CRC is successful, and may use two retransmitted subframes for the SD-RSRP measurement. Accordingly, the SD-RSRP measurement accuracy may be enhanced.

Alternatively, the UE #2 100-2 does not perform decoding for the third retransmission of the PSDCH, assumes that the CRC is successful, and then, may use four (that is, initial transmission and first, second, and third retransmissions) subframes for the SD-RSRP measurement. In this case, although the CRC is not successful for the initial transmission and the first retransmission of the PSDCH, the UE #2 100-2 may assume that the CRC is successful even for the initial transmission and the first retransmission of the PSDCH and consider that the subframes are used for the SD-RSRP measurement even for the initial transmission and the first retransmission because the CRC is successful for the second retransmission of the PSDCH. However, accordingly, the subframe in which the CRC is unsuccessful needs to be buffered, so that the memory may be wasted and the complexity may increase.

Figure 12D:
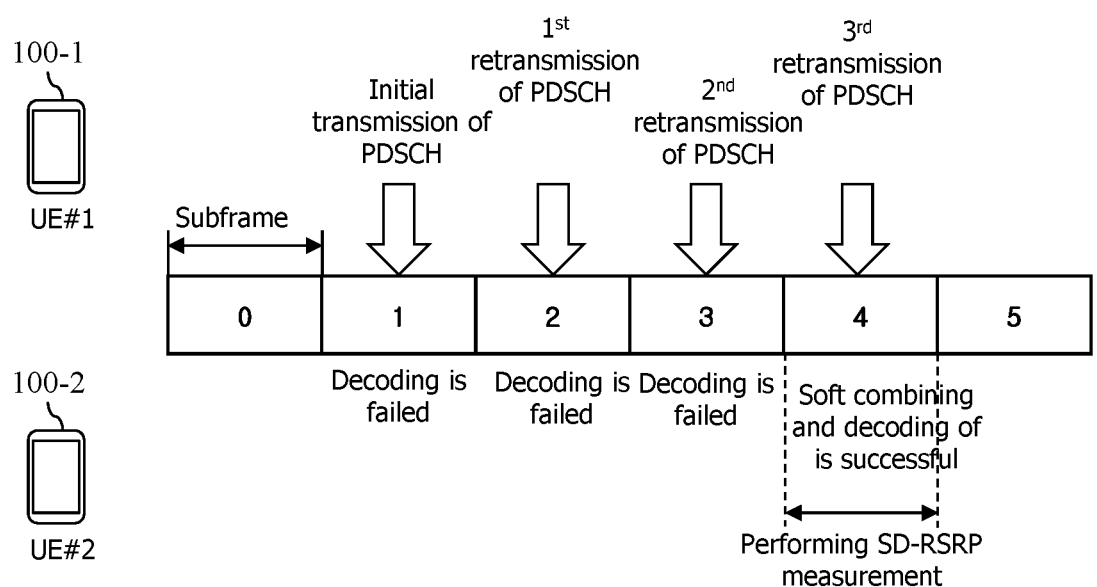
FIG. 12D illustrates an example in which the CRC for third retransmission of the PDSCH is successful.

FIG. 12D illustrates an example in which the CRC for third retransmission of the PDSCH is successful.

As illustrated in FIG. 12D, the UE #2 100-2 fails to decode the initial transmission of the PSDCH and the first and second retransmissions of the PSDCH, but succeeds in decoding the third retransmission of the PSDCH, and as a result, the CRC is successful.

In this case, when the SD-RSRP measurement needs to be performed on the subframe in which the CRC is successful, the UE #2 100-2 needs to perform the SD-RSRP measurement only on the subframe in which the third retransmission of the PSDCH is received. However, accordingly, there is a disadvantage that the number of SD-RSRP measurements is small.

On the contrary, the UE #2 100-2 assumes that the CRC is successful even for the third retransmission of the PSDCH, but the CRC is successful even for the initial transmission and the first and second retransmissions of the PSDCH and may use four (that is, initial transmission and first, second, and third retransmissions) for the SD-RSRP measurement. However, accordingly, the subframe in which the CRC is unsuccessful needs to be buffered, so that the memory may be wasted and the complexity may increase. However, the SD-RSRP measurement accuracy may be enhanced.

In view of the above description with reference to FIGS. 12A to 12D, in order to increase the SD-RSRP measurement accuracy so as not to significantly increase the complexity of the implementation, when the CRC is successful, the subsequent retransmission subframe may be used for the SD-RSRP measurement, assuming that the CRC is successful without performing the decoding.

However, in the case where the complexity of the implementation is not an issue, when initial CRC is successful among the subframes, both the previous subframe and the subsequent subframe (in which the decoding is not performed) may be used for the RSRP measurement. In this case, the SD-RSRP measured on the subframe in which the CRC is not successful is separately buffered and may be used after the CRC is successful.

Figure 13:
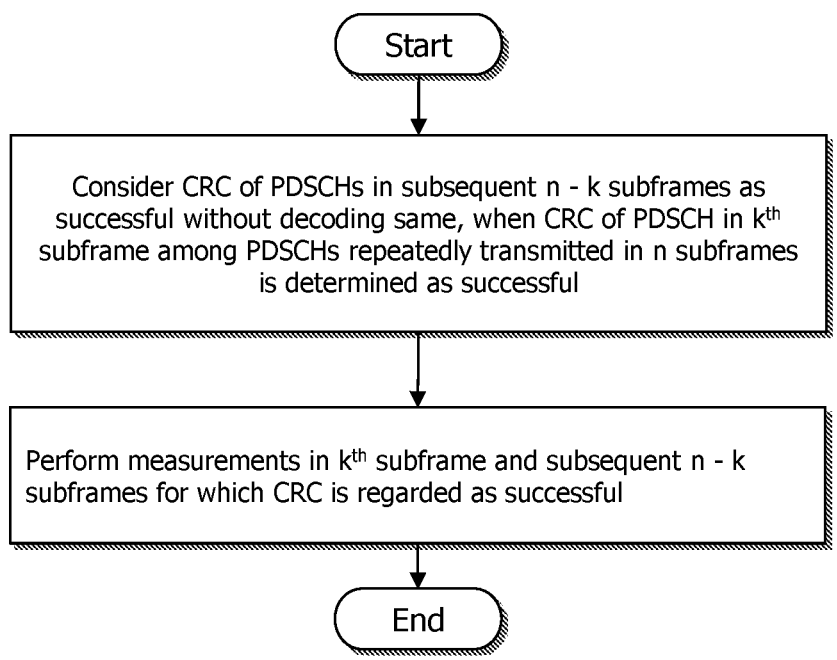
FIG. 13 is a flowchart schematically illustrating a method according to the disclosure of the present specification.

FIG. 13 is a flowchart schematically illustrating a method according to the disclosure of the present specification.

Referring to FIG. 13, when the cyclic redundancy check (CRC) is successful according to the decoding success of the PSDCH on the kth subframe among PSDCHs repeatedly transmitted on n subframes from adjacent UEs, the UE may regard that the CRC is successful without decoding the PSDCH on n–k subsequent subframes.

In addition, the UE may perform measurements on the kth subframe and n–k subsequent subframes in which the CRC is regarded to be successful, that is, the SD-RSRP measurement.

However, when n–k is smaller than a predetermined number, the UE may regard the CRC to be successful and use even the kth previous subframe for the measurement even though the CRC on the subframe before the kth subframe is not successful.

The UE may select the UE which may serve as the repeater based on an execution result of the measurement.

Hereinafter, a cumulative distribution function (CDF) and RSRP measurement success rate of absolute RSRP will be described as two simulation results according to the above-described simulation assumption.

The simulation result may be represented as below as 6 cases.

1-A: Scenario 1 (one UE transmits): numRetx=0
1-B: Scenario 1 (one UE transmits): numRetx=3 and deactivation of soft combining
1-C: Scenario 1 (one UE transmits): numRetx=3 and activation of soft combining
2-A: Scenario 2 (two UEs transmit): numRetx=0
2-B: Scenario 2 (2 TxUE): numRetx=3 and deactivation of soft combining
2-C: Scenario 2 (2 TxUE): numRetx=3 and activation of soft combining The CRF and the RSP measurement success rate of delta RSRP are summarized in tables below with respect to each scenario.

The table below shows the CDF of the delta RSRP according to scenario 1 under additive white Gaussian noise (AWGN).

TABLE 12

| | 1-A | | | 1-B | | | 1-C | | |
|---|---|---|---|---|---|---|---|---|---|
| SNR | 50% | 5% | 95% | 50% | 5% | 95% | 50% | 5% | 95% |
| −6 | NA | NA | NA | NA | NA | NA | 1.56 | −0.17 | 3.19 |
| −5 | NA | NA | NA | NA | NA | NA | 1.18 | 0.47 | 1.88 |
| −4 | NA | NA | NA | NA | NA | NA | 0.88 | 0.39 | 1.36 |
| −3 | NA | NA | NA | NA | NA | NA | 0.69 | 0.30 | 1.06 |
| −2 | 0.84 | −1.07 | 2.09 | 0.69 | −0.31 | 1.55 | 0.56 | 0.22 | 0.90 |
| −1 | 0.61 | −0.73 | 1.79 | 0.53 | −0.05 | 1.07 | 0.48 | 0.19 | 0.77 |
| 0 | 0.45 | −0.12 | 0.98 | 0.43 | 0.18 | 0.66 | 0.42 | 0.18 | 0.66 |
| 1 | 0.37 | −0.05 | 0.78 | 0.38 | 0.16 | 0.58 | 0.38 | 0.16 | 0.58 |
| 2 | 0.35 | −0.02 | 0.71 | 0.35 | 0.16 | 0.53 | 0.35 | 0.16 | 0.53 |
| 3 | 0.33 | −0.01 | 0.64 | 0.32 | 0.16 | 0.48 | 0.32 | 0.16 | 0.48 |
| 4 | 0.30 | 0.01 | 0.59 | 0.30 | 0.16 | 0.44 | 0.30 | 0.16 | 0.44 |
| 5 | 0.28 | 0.03 | 0.53 | 0.28 | 0.15 | 0.40 | 0.28 | 0.15 | 0.40 |

The table below shows the RSRP measurement success rate of the delta RSRP according to scenario 1 under the additive white Gaussian noise (AWGN).

TABLE 13

| SNR | 1-A | 1-B | 1-C |
|---|---|---|---|
| −6 | 0.0000 | 0.0000 | 0.0463 |
| −5 | 0.0000 | 0.0000 | 0.2839 |
| −4 | 0.0000 | 0.0000 | 0.5082 |
| −3 | 0.0000 | 0.0000 | 0.6970 |
| −2 | 0.0023 | 0.0048 | 0.7495 |
| −1 | 0.1396 | 0.2648 | 0.7861 |
| 0 | 0.7658 | 0.9181 | 0.9423 |
| 1 | 0.9932 | 0.9987 | 0.9987 |
| 2 | 0.9999 | 1.0000 | 1.0000 |
| 3 | 1.0000 | 1.0000 | 1.0000 |
| 4 | 1.0000 | 1.0000 | 1.0000 |
| 5 | 1.0000 | 1.0000 | 1.0000 |

The table below shows the CDF of the delta RSRP according to scenario 1 under extended pedestrian A (EPA) 5 Model.

TABLE 14

| | 1-A | | | 1-B | | | 1-C | | |
|---|---|---|---|---|---|---|---|---|---|
| SNR | 50% | 5% | 95% | 50% | 5% | 95% | 50% | 5% | 95% |
| −6 | 2.33 | 0.67 | 3.74 | 0.60 | −0.77 | 2.92 | 0.50 | −0.94 | 2.23 |
| −5 | 2.10 | 0.29 | 3.61 | 0.65 | −0.78 | 2.49 | 0.55 | −0.56 | 1.90 |
| −4 | 1.97 | −0.05 | 3.49 | 0.64 | −0.45 | 2.42 | 0.52 | −0.37 | 1.61 |
| −3 | 1.66 | −0.45 | 3.23 | 0.60 | −0.31 | 1.97 | 0.53 | −0.17 | 1.44 |
| −2 | 1.61 | −0.20 | 3.08 | 0.61 | −0.17 | 1.72 | 0.52 | −0.06 | 1.28 |
| −1 | 1.47 | −0.25 | 2.87 | 0.58 | −0.05 | 1.52 | 0.51 | −0.02 | 1.23 |
| 0 | 1.26 | −0.40 | 2.58 | 0.54 | −0.02 | 1.30 | 0.49 | 0.00 | 1.13 |
| 1 | 1.06 | −0.54 | 2.35 | 0.51 | 0.02 | 1.19 | 0.47 | 0.03 | 1.08 |
| 2 | 0.90 | −0.65 | 2.14 | 0.47 | 0.03 | 1.12 | 0.44 | 0.04 | 1.03 |
| 3 | 0.76 | −0.75 | 1.99 | 0.43 | 0.05 | 1.05 | 0.41 | 0.04 | 0.99 |
| 4 | 0.65 | −0.86 | 1.83 | 0.41 | 0.05 | 1.00 | 0.39 | 0.04 | 0.95 |
| 5 | 0.58 | −0.93 | 1.76 | 0.39 | 0.04 | 0.95 | 0.37 | 0.04 | 0.92 |

The table below shows the RSRP measurement success rate according to scenario 1 under the EPA 5 Model.

TABLE 15

| SNR | 1-A | 1-B | 1-C |
|---|---|---|---|
| −6 | 0.0060 | 0.0105 | 0.1536 |
| −5 | 0.0255 | 0.0458 | 0.2602 |
| −4 | 0.0662 | 0.1103 | 0.3838 |
| −3 | 0.1154 | 0.2238 | 0.5069 |
| −2 | 0.2276 | 0.3548 | 0.6184 |
| −1 | 0.3439 | 0.4971 | 0.7129 |
| 0 | 0.4631 | 0.6350 | 0.7909 |
| 1 | 0.5837 | 0.7487 | 0.8528 |
| 2 | 0.6912 | 0.8282 | 0.8947 |
| 3 | 0.7722 | 0.8870 | 0.9267 |
| 4 | 0.8271 | 0.9233 | 0.9488 |
| 5 | 0.8853 | 0.9503 | 0.9658 |

The table below shows the CDF of the delta RSRP according to scenario 1 under extended typical urban (ETU) 70 Model.

TABLE 16

| | 1-A | | | 1-B | | | 1-C | | |
|---|---|---|---|---|---|---|---|---|---|
| SNR | 50% | 5% | 95% | 50% | 5% | 95% | 50% | 5% | 95% |
| −6 | 2.74 | 0.30 | 4.68 | 1.34 | −0.86 | 3.53 | 0.59 | −1.58 | 2.76 |
| −5 | 2.68 | 0.46 | 4.21 | 0.67 | −0.97 | 3.16 | 0.57 | −1.04 | 2.24 |
| −4 | 2.31 | 0.07 | 4.08 | 0.84 | −0.79 | 2.81 | 0.60 | −0.59 | 1.80 |
| −3 | 2.14 | −0.23 | 3.95 | 0.80 | −0.55 | 2.49 | 0.61 | −0.28 | 1.49 |
| −2 | 1.87 | −0.39 | 3.70 | 0.76 | −0.31 | 2.14 | 0.58 | −0.13 | 1.36 |
| −1 | 1.62 | −0.43 | 3.37 | 0.69 | −0.15 | 1.62 | 0.55 | −0.09 | 1.20 |
| 0 | 1.39 | −0.49 | 2.94 | 0.61 | −0.04 | 1.38 | 0.52 | −0.09 | 1.14 |
| 1 | 1.19 | −0.48 | 2.56 | 0.55 | −0.05 | 1.18 | 0.48 | −0.08 | 1.04 |
| 2 | 0.97 | −0.61 | 2.29 | 0.47 | −0.06 | 1.05 | 0.42 | −0.09 | 0.95 |
| 3 | 0.79 | −0.73 | 2.03 | 0.44 | −0.07 | 0.99 | 0.40 | −0.13 | 0.91 |
| 4 | 0.63 | −0.86 | 1.84 | 0.39 | −0.11 | 0.90 | 0.39 | −0.11 | 0.88 |
| 5 | 0.52 | −0.99 | 1.74 | 0.37 | −0.12 | 0.87 | 0.35 | −0.14 | 0.83 |

The table below shows the RSRP measurement success rate according to scenario 1 under the EPA 70 Model.

TABLE 17

| SNR | 1-A | 1-B | 1-C |
|---|---|---|---|
| −6 | 0.0012 | 0.0028 | 0.0788 |
| −5 | 0.0067 | 0.0146 | 0.1684 |
| −4 | 0.0242 | 0.0461 | 0.2924 |
| −3 | 0.0626 | 0.1255 | 0.4322 |
| −2 | 0.1326 | 0.2449 | 0.5637 |
| −1 | 0.2320 | 0.3956 | 0.6754 |
| 0 | 0.3560 | 0.5557 | 0.7662 |
| 1 | 0.4876 | 0.6989 | 0.8339 |
| 2 | 0.6086 | 0.8063 | 0.8864 |
| 3 | 0.7168 | 0.8790 | 0.9235 |
| 4 | 0.8034 | 0.9243 | 0.9473 |
| 5 | 0.8684 | 0.9549 | 0.9659 |

The table below shows the CDF of the delta RSRP according to scenario 2 under the additive white Gaussian noise (AWGN).

TABLE 18

| SNR | 2-A | | | 2-B | | | 2-C | | |
|---|---|---|---|---|---|---|---|---|---|
| (SINR) | 50% | 5% | 95% | 50% | 5% | 95% | 50% | 5% | 95% |
| 3 (−1.76) | NA | NA | NA | NA | NA | NA | NA | NA | NA |
| 6 (1.24) | NA | NA | NA | NA | NA | NA | 3.07 | 2.96 | 3.18 |
| 9 (4.24) | 2.09 | 1.95 | 2.22 | 2.08 | 2.02 | 2.15 | 2.08 | 2.02 | 2.15 |
| 12 (7.24) | 1.40 | 1.30 | 1.51 | 1.40 | 1.35 | 1.46 | 1.40 | 1.35 | 1.46 |

The table below shows the RSRP measurement success rate of the delta RSRP according to scenario 2 under the additive white Gaussian noise (AWGN).

TABLE 19

| SNR(SINR) | 2-A | 2-B | 2-C |
|---|---|---|---|
| 3 (−1.76) | 0.0000 | 0.0000 | 0.0000 |
| 6 (1.24) | 0.0000 | 0.0000 | 0.5159 |
| 9 (4.24) | 0.9443 | 0.9848 | 0.9866 |
| 12 (7.24) | 1.0000 | 1.0000 | 1.0000 |

The table below shows the CDF of the delta RSRP according to scenario 2 under the extended pedestrian A (EPA) 5 Model.

TABLE 20

| SNR | 2-A | | | 2-B | | | 2-C | | |
|---|---|---|---|---|---|---|---|---|---|
| (SINR) | 50% | 5% | 95% | 50% | 5% | 95% | 50% | 5% | 95% |
| 3 (−1.76) | 3.21 | −0.60 | 7.01 | 3.24 | 1.07 | 5.75 | 3.29 | 1.41 | 5.44 |
| 6 (1.24) | 2.03 | −1.34 | 4.55 | 1.97 | 0.35 | 3.82 | 2.03 | 0.52 | 3.80 |
| 9 (4.24) | 1.33 | −1.32 | 3.45 | 1.30 | 0.05 | 2.65 | 1.30 | 0.08 | 2.63 |
| 12 (7.24) | 0.89 | −1.49 | 2.74 | 0.88 | −0.08 | 1.93 | 0.87 | −0.08 | 1.91 |

The table below shows the RSRP measurement success rate according to scenario 2 under the EPA 5 Model.

TABLE 21

| SNR(SINR) | 2-A | 2-B | 2-C |
|---|---|---|---|
| 3 (−1.76) | 0.3619 | 0.5107 | 0.6707 |
| 6 (1.24) | 0.5555 | 0.7073 | 0.7999 |
| 9 (4.24) | 0.7765 | 0.8687 | 0.9048 |
| 12 (7.24) | 0.9174 | 0.9546 | 0.9648 |

The table below shows the CDF of the delta RSRP according to scenario 2 under the ETU 70 Model.

TABLE 22

| SNR | 2-A | | | 2-B | | | 2-C | | |
|---|---|---|---|---|---|---|---|---|---|
| (SINR) | 50% | 5% | 95% | 50% | 5% | 95% | 50% | 5% | 95% |
| 3 (−1.76) | 3.97 | 0.37 | 7.67 | 3.61 | 1.70 | 5.46 | 3.57 | 2.01 | 5.06 |
| 6 (1.24) | 2.32 | −0.33 | 4.67 | 2.13 | 0.86 | 3.37 | 2.17 | 0.97 | 3.32 |
| 9 (4.24) | 1.55 | −0.42 | 3.27 | 1.39 | 0.41 | 2.35 | 1.38 | 0.42 | 2.33 |
| 12 (7.24) | 0.98 | −0.72 | 2.45 | 0.88 | 0.08 | 1.69 | 0.88 | 0.07 | 1.68 |

The table below shows the RSRP measurement success rate according to scenario 2 under the ETU 70 Model.

TABLE 23

| SNR(SINR) | 2-A | 2-B | 2-C |
|---|---|---|---|
| 3 (−1.76) | 0.2597 | 0.4550 | 0.6044 |
| 6 (1.24) | 0.4138 | 0.6383 | 0.7338 |
| 9 (4.24) | 0.6769 | 0.8509 | 0.8853 |
| 12 (7.24) | 0.8718 | 0.9542 | 0.9619 |

From the above simulation results, the following matters may be summarized.

Summary 1: When the PSDCH is retransmitted, the RSRP measurement success rate when the soft combining is performed is higher than the RSRP measurement success rate when the soft combining is not performed.

Summary 2: In a non-confliction situation where only one UE transmits, there is a difference of approximately 2 dB to 3 dB when performing the soft combining and when not performing the soft combining, based on the RSRP measurement success rate of 70%.

Summary 3: In the non-confliction situation where only one UE transmits, the existing absolute S-RSRP measurement accuracy may be reused in an SINR based on the RSRP measurement success rate of 70%.

Summary 4: In a confliction situation where two UEs transmit, there is the difference of approximately 2 dB to 3 dB when performing the soft combining and when not performing the soft combining, based on the RSRP measurement success rate of 70%.

Summary 5: The SINR in the confliction situation where two UEs transmit is higher than the SINR in the non-confliction situation by approximately 2 dB to 3 dB based on the RSRP measurement success rate of 70%.

Summary 6: In the confliction situation where two UEs transmit, the existing absolute S-RSRP measurement accuracy may be reused in the SINR based on the RSRP measurement success rate of 70%.

The following proposals may be given based on the summaries.

Proposal 1: For a minimum SD-RSRP measurement requirement to select the repeater UE, the soft combining need not be enforced.

Proposal 2: For the minimum SD-RSRP measurement requirement to select the repeater UE, the UE need not be particularly implemented.

Proposal 3: To select a stable repeater UE based on the measurement accuracy of the RSRP, it is necessary to consider the RSRP measurement accuracy of 70% or the SINR corresponding to the RSRP measurement accuracy of 70% or more.

Proposal 4: Since both the confliction situation and the non-confliction situation are satisfied in the RSRP measurement accuracy of 70% or more, the SINR of 3 dB is proposed as an additional condition.

Proposal 5: The requirement for the existing S-RSRP measurement accuracy may be reused to select the repeater UE in the SINR that matches the RSRP measurement accuracy of 70% or more.

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 14:
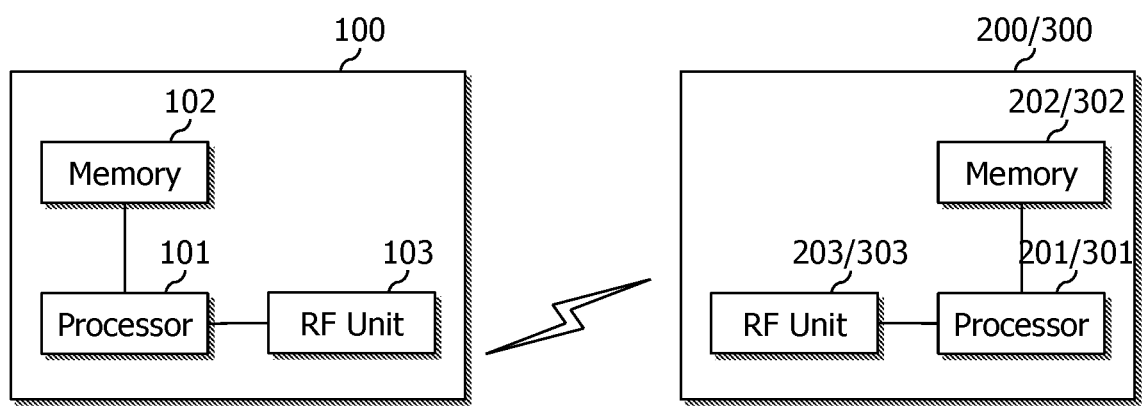
FIG. 14 is a block diagram illustrating a wireless communication system in which the disclosure of the present specification is implemented.

FIG. 14 is a block diagram illustrating a wireless communication system in which the disclosure of the present specification is implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

A UE 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing measurement on a physical sidelink discovery channel (PSDCH) including a discovery signal from an adjacent terminal, the method comprising:

performing a sequential decoding in n subframes in which a PSDCH signal is repeatedly received from the adjacent terminal;

based on (i) that the PSDCH signal in a $k^{th}$ subframe among the n subframes is successfully decoded and (ii) that a cyclic redundancy check (CRC) in the $k^{th}$ subframe is determined as successful, stopping the sequential decoding in subsequent n-k subframes;

considering CRCs in the subsequent n-k subframes as successful without performing the sequential decoding; and performing measurements in the $k^{th}$ subframe and the subsequent n-k subframes for which the CRC is regarded as successful, wherein when n−k is smaller than a predetermined number, the CRC is regarded as successful and even a kth previous subframe is used for the measurement even though the CRC on a subframe before the kth subframe is not successful.

2. The method of claim 1, wherein the measurement is a sidelink discovery reference signal received power (SD-RSRP) measurement.

3. The method of claim 2, wherein the SD-RSRP means an average received power on a resource element (RE) including a demodulation reference signal (DMRS) for demodulating the PSDCH in a subframe for which the CRC is regarded as successful.

4. The method of claim 1, further comprising:

selecting a User Equipment (UE) which is able to serve as a repeater based on an execution result of the measurement.

5. A User Equipment (UE) performing measurement, comprising:

a transceiver receiving a physical sidelink discovery channel (PSDCH) including a discovery signal repeatedly transmitted on n subframes from an adjacent UE; and a processor configured to:

perform a sequential decoding in n subframes in which a PSDCH signal is repeatedly received from the adjacent terminal;

based on (i) that the PSDCH signal in a $k^{th}$ subframe among the n subframes is successfully decoded and (ii) that a cyclic redundancy check (CRC) thereof is determined as successful, consider CRCs in the subsequent n-k subframes as successful without performing the sequential decoding, and perform the measurement on the $k^{th}$ subframe and n k subsequent subframes for which the CRC is regarded as successful, wherein when n−k is smaller than a predetermined number, the CRC is regarded as successful and even a kth previous subframe is used for the measurement even though the CRC on a subframe before the kth subframe is not successful.

6. The UE of claim 5, wherein the measurement is a sidelink discovery reference signal received power (SD-RSRP) measurement.

7. The UE of claim 6, wherein the SD-RSRP means an average received power on a resource element (RE) including a demodulation reference signal (DMRS) for demodulating the PSDCH in a subframe for which the CRC is regarded as successful.

8. The UE of claim 5, wherein the processor selects a UE which is able to serve as a repeater based on an execution result of the measurement.

* * * * *